United States Patent Office 3,496,132
Patented Feb. 17, 1970

3,496,132
VISCOSITY CONTROL ADDITIVES IN POLYAMIDE ACID SOLUTIONS
Edith M. Boldebuck, Schenectady, and Richard F. Gaertner, Rexford, N.Y., assignors to General Electric Company, a corporation of New York
No Drawing. Filed May 5, 1966, Ser. No. 547,798
Int. Cl. C08g 20/32
U.S. Cl. 260—32.6                                              21 Claims

ABSTRACT OF THE DISCLOSURE

Lower viscosity polyamide acid solutions are produced when one reacts (a) benzophenone dianhydride and (b) a diamine, in the presence of an additive selected from the n group consisting of ammonium salts of saturated monocarboxylic acids having from one to five carbon atoms, ammonium salts of aromatic monocarboxylic acids a strong organic acid, when the reaction is conducted in a solvent such as the dialkylcarboxylamides, N-methyl-2-pyrrolidone and the like below 40° C. These polyamide acid solutions are substantially free of any polyimide resin. These polyamide acid solutions are useful as coating solutions, as impregnating agents for bonding glass fibers, in making laminations, and as coatings for metal substrates for use as thermal and electrical insulating films.

---

This invention relates to synthetic polymer compositions and methods for preparing such materials. More particularly, the invention is concerned with a process for making a polyamide acid solution which comprises (1) forming in an anhydrous, non-reactive, non-hydroxylic organic solvent a mixture of ingredients comprising (a) at least one benzophenone dianhydride (e.g., 2,2′, 3,3′-, 2,3,3′,4′-, 3,3′,4,4′ - benzophenonetetracarboxylic acid dianhydride), (b) at least one diamine selected from the group consisting of m-phenylenediamine, and diamines having the formula

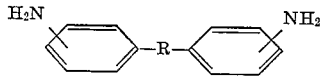

where R is a divalent radical selected from the group consisting of $C_{1-3}$ alkylene,

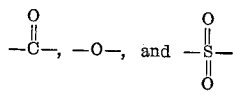

and (c) an additive selected from the group consisting of (i) an ammonium salt of a saturated monocarboxylic acid having from one to five carbon atoms, (ii) an ammonium salt of an aromatic monocarboxylic acid, and (iii) a strong organic acid, and (2) allowing the reactants to interact at a temperature below 40° C., e.g., from 20° C. to ambient temperatures, such as 25 to 30° C., advantageously under anhydrous conditions to form the polyamide acid substantially free of any polyimide groups derived from the polyamide acid.

U.S. Patent 3,179,614, issued Apr. 29, 1965, describes a class of resins comprising polyamide acid resins which are generally prepared by the reaction of a dianhydride of a tetracarboxylic acid with various diamines. The most widely used dianhydride is pyromellitic dianhydride, although this patent does describe a number of other dianhydrides. In accordance with this patent, the dianhydride and the diamine are reacted in the presence of a number of recited organic solvents for both the reactants and the intermediate polymeric acid amide.

U.S. 3,242,128, issued Mar. 22, 1966, describes a class of resins comprising polyamide acid resins which are generally prepared by the reaction of a dianhydride of a tetracarboxylic acid with various diamines. In accordance with this patent, the dianhydride and the diamine are reacted in the presence of a number of recited organic solvents for both the reactants and the intermediate polymeric acid amide. A small proportion of a weak acid such as formic acid or monochloroacetic acid, or benzaldehyde, p-nitrobenzaldehyde, or p-aminophenol is added to the polyamide acid solution to retard the rate of viscosity increase of the solution during storage.

It is desirable that the viscosity of the polyamide acid be readily adjusted in the reaction solvent at room temperature so as to permit the use of the solution for coating purposes. After shaping or coating a substrate, the polyamide acid is readily converted to the polyimide form by chemical or thermal means to produce products having excellent solvent resistance and resistance to flow at elevated temperatures.

Unexpectedly it has been discovered that it is possible to prepare soluble polyamide acid resins in which the viscosity can be adjusted readily. The additive provides a simple direct process in which the variation in its amount controls the solution viscosity which results in improved ability of the polyamide acid solution to impregnate porous materials, easier coating of wires by means of dies, etc., at a high solids content.

We have unexpectedly discovered that it is possible to prepare polyamide acid solutions in which the viscosity is controlled if we incorporate in the organic solvent as the additive an ammonium salt of an organic monocarboxylic acid having from one to five carbon atoms of the formula

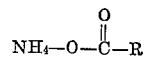

where R is a monovalent hydrocarbon radical, such as ammonium formate, ammonium acetate, ammonium propionate, ammonium butyrate, ammonium valerate, etc., or an ammonium salt of an aromatic monocarboxylic acid such as ammonium benzoate or ammonium toluate. Such an additive may also be incorporated by its preparation as an integral part of the process or by the addition of its component parts in the organic solvent.

We have found also unexpectedly that similar beneficial results are attained when we incorporate in the solvent as the additive a strong organic acid which is soluble in the solvent and has a dissociation constant of at least $5 \times 10^{-2}$ as measured in an aqueous system, such as trichloroacetic acid, methane sulfonic acid, etc. For example, we have found that by adding from 0.012 to 2 moles of such an ammonium salt or strong organic acid to 1 mole of the dianhydride, we are able to control the viscosity of the formed polyamide acid in the solvent.

Various solvents which are useful in the present invention are the organic solvents whose functional groups do not react with either of the reactants (the diamines or the dianhydrides) to a greater extent than the reactants do with each other. Besides being inert to the system and, preferably, being a solvent for the product, the organic solvent must be a solvent for at least one of the reactants, preferably for both of the reactants. Thus, the organic solvent is an organic liquid other than either reactant or homologs of the reactants, that is, a solvent for at least one reactant, and contains functional groups, the functional groups being groups other than monofunctional primary and secondary amino groups and other than the monofunctional dicarboxylanhydro groups. The non-reactive organic solvent does not contain any aliphatic or aromatic hydroxyl group. The normally liquid organic solvents of the N,N-dialkylcarboxylamide class are useful as solvents in the process of this invention. The lower molecular weight members of this class, particularly N,N - dimethylformamide and N,N - dimethylacetamide may easily be removed from the polyamide-acid and/or polyamide acid shaped articles by evaporation, displacement or diffusion. Other typical compounds of this useful class of solvents are: N,N-diethylformamide, N,N-diethylacetamide, N,N-dimethylmethoxy acetamide, N-methyl caprolactam, etc. Other solvents which are useful in the present invention are: N-methyl-2-pyrrolidone, tetramethylene urea, dimethylsulfone, tetramethylenesulfone, and N-acetyl-2-pyrrolidone. The solvents can be used alone, in combinations of solvents, or in combination with other less solvating solvents such as benzene, benzonitrile, dioxane, butyrolactone, xylene, toluene, and cyclohexane.

In carrying out the reaction it is preferable to add the diamine to the dianhydride and additive which are in a solvent of N-methyl-2-pyrrolidone or N,N-dimethylacetamide and allow the mixture to remain advantageously with stirring at ambient temperatures employing cooling, if necessary to maintain the temperature of the mixture below 40° C. to avoid polyimide formation. The use of a continuous process for making these polyamide acids is especially served by the use of the additive in the solvent to provide a controlled solution viscosity.

Various diamines have been found useful for reacting with the above-described dianhydrides. Of the various diaminobenzenes, m-phenylenediamine will give polymers with the carbonyl-diphthalic anhydrides which are soluble in the solvents. Of the various binuclear diamines, those diamines in which one amino group is on each of the phenyl groups and the phenyl groups are separated by an alkylene, carbonyl, oxygen or sulfonyl radical will give polymeric products with the dianhydrides which are soluble in the solvent. Typical examples of such diamines are the various isomeric ortho-, meta-, and para-oxydianilines, e.g., 2,2' - oxydianiline, 3,3' - oxydianiline, 4,4' - oxydianiline, 2,3' - oxydianiline, 2,4' - oxydianiline, 3,4'-oxydianiline, etc.; the alkylenedianilines, especially those in which the alkylene group has from one to three carbon atoms, e.g., methylenedianiline, ethylidenedianiline, ethylenedianiline, propylidenedianiline, propylenedianiline, etc., including the various ortho-, meta- and para-isomers thereof, the various ortho-, meta- and para-isomers of diaminobenzophenone, and the various ortho-, meta- and para-isomers of sulfonyldianiline. Of these diamines, m - phenylenediamine (m - PDA), 4,4' - oxydianiline (ODA), 4,4'-methylenedianiline (MDA), and 4,4'-sulfonyldianiline are the most readily available.

The initial temperature, before the addition of the diamine, should be about or below room temperature. After the addition of the diamine, the temperature usually rises 10 to 15 degrees, due to the fact that the reaction is exothermic. At these temperatures the addition reaction to form the polyamide acid is usually complete at the end of about 30 minutes to one hour, as is shown by the increase in the viscosity of the reaction mixture. The cyclization reaction to form the polymeric imides proceeds advantageously at a temperature of about 125° C. to 300° C. to form a clear flexible film when cast on a glass substrate. In applying coatings or depositing films from solution, the temperatures used to remove the solvent should be raised gradually to obtain smooth coatings and films.

Of the various dianhydrides, the most readily available and preferred dianhydride is 3,3',4,4'-benzophenonetetracarboxylic acid dianhydride. These anhydrides may be made in the manner described in U.S. 3,078,379—McCracken et al.

In forming the polymeric products it is only required to mix one or more of the dianhydrides with one or more of the above named amines and with one of the above named additives in the presence of the liquid organic solvent; they go into solution rapidly and appear to react in a short period of time to produce a polymeric amide acid solution which remains liquid and homogeneous at room temperature. This polymer usually has an intrinsic viscosity of 0.10 to 0.50 at room temperature when measured in the solvent used for making the polyamide acid. If desired, an inert atmosphere, e.g., nitrogen, can be used in the reaction vessel to retard oxidation of the amines to produce lighter colored polymers. Monoamines such as aniline, p-biphenylamine, benzylamine, or anhydrides, of a dicarboxylic acid, such as phthalic anhydride or maleic anhydride or other reagents reactive with amines or carboxylic acids may be used to chain-stop or modify the polymers. These may be added at the start, during, or at the end of the polymer-forming reaction and may be used to react with any slight excess of either the diamine or dianhydride used initially.

The amount of organic solvent used should be sufficient to produce a homogeneous solution with the reactants and polyamide acid polymer, and yet not be too viscous so as to introduce handling problems. Optimum concentrations are in the range of 5 to 40 percent, by weight, polymer and 60 to 95 percent, by weight, solvent mixture, based on the end use.

In order that those skilled in the art may better understand how the invention may be practiced, the following examples are given by way of illustration and not by way of limitation. All percentages are by weight, unless otherwise stated. Anhydrous conditions were maintained at all times.

EXAMPLES 1–3

In these examples, Example 1 was a control with no addition of an additive, while ammonium acetate and methane sulfonic acid were the additives in Examples 2 and 3, respectively. The solvent employed was N-methyl-2-pyrrolidone (N-MP), which had been distilled and dried through a molecular sieve. In Example 1, 3,3',4,4'-benzophenonetetracarboxylic acid dianhydride (BPDA) was added to the N-methyl-2-pyrrolidone (N-MP) solvent and the solution was stirred. m-Phenylene diamine (m-PDA) was then added to the solution which was stirred. In Examples 2 and 3, both BPDA and the additive were added to the N-MP solvent and the mixture stirred prior to the addition of m-PDA. A sample of each solution was cast on a glass substrate and heated for two minutes at 250° C. to yield a tough, flexible, insoluble polyimide film. The following Table 1 shows the ingredients and proportions of ingredients used, and the solution viscosities.

TABLE 1

| | A | B | C | D | | |
|---|---|---|---|---|---|---|
| Example | Dianhydride BPDA, grams | Additive, grams | Diamine m-PDA, grams | Solvent N-MP, grams | Mole Ratio, A/B | Solution Viscosity after 1 day at 25° C., Centistokes at 25° C. |
| 1 | 1.476 | None | 0.520 | 7.73 | 1/0 | 900 |
| 2 | 1.765 | [1] 0.439 | 0.621 | 9.23 | 1/1 | 29 |
| 3 | 1.603 | [2] 0.540 | 0.565 | 8.65 | 1/1 | 272 |

[1] Ammonium acetate.
[2] Methane sulfonic acid.

EXAMPLES 4-6

In these examples, Example 4 was a control with no addition of an additive, while ammonium benzoate and trichloroacetic acid were the additives in Examples 5 and 6. The solvent employed was N,N'-dimethylacetamide (DMAC) which had been distilled but was not purified further. BPDA was dissolved in the solvent with slight warming to make a 20 weight percent solution. In each of Examples 5 and 6, the additive was dissolved in the solution with slight warming. A 20 weight percent solution of oxydianiline (ODA) in the DMAC solvent was added in each of the examples and the mixture stirred. A sample of each solution was cast on a glass substrate and heated for two minutes at 250° C. to yield a tough, flexible, insoluble polyimide film. The following Table 2 shows the ingredients and the proportions of ingredients used, and the solution viscosities.

TABLE 2

| Example | A<br>Dianhydride<br>BPDA.<br>grams | B<br>Additive,<br>grams | C<br>Diamine, g.—<br>20% ODA in<br>DMAC | G. Solvent—<br>DMAC added<br>to BPDA | Mole<br>Ratio,<br>A/B | Solution Viscosity after 1 day at 25° C. Centistokes at 25° C. |
|---|---|---|---|---|---|---|
| 4 | 1.468 | None | 4.473 | 5.92 | 1/0 | 117 |
| 5 | 1.634 | ¹ 0.699 | 5.252 | 6.57 | 1/1 | 10 |
| 6 | 1.561 | ² 0.810 | 4.957 | 6.31 | 1/1 | 23 |

¹ Ammonium benzoate.
² Trichloroacetic acid.

EXAMPLES 7-13

In these examples, Example 7 was a control with no addition of an additive, while ammonium benzoate in different amounts was the additive in Examples 8-13. The solvent employed was N-MP, which had been distilled and dried by passing through a column of molecular sieve 4A. The dianhydride was BPDA, while the diamine was methylenedianiline (MDA). In Examples 8-13, the solid BPDA and the additive, ammonium benzoate, were weighed out and N-MP was added to make a 20% solution of BPDA in N-MP. The solution was warmed slightly until the dianhydride and additive had completely dissolved, and was then cooled to room temperature. If the solution, which contained a small amount of the additive, was allowed to stand for a period of time, the BPDA would recrystallize. A 20% solution of MDA dissolved in N-MP was then added, and the solution was stirred at room temperature to obtain a homogeneous solution. A sample of each solution was cast on a glass substrate and heated for two minutes at 250° C. to yield a tough, flexible, insoluble polyimide film. The following Table 3 shows the ingredients and the proportion of the ingredients used.

TABLE 3

| Example | A<br>Dianhydride<br>BPDA,<br>grams | B<br>Additive,<br>grams | C<br>Diamine,<br>grams—20%<br>MDA in N-MP | D<br>Solvent—N-MP<br>Added to A and B | Mole<br>Ratio,<br>A/B |
|---|---|---|---|---|---|
| 7 | 1.583 | None | 5.010 | 6.339 | 1/0 |
| 8 | 1.582 | 0.008 | 5.008 | 6.436 | 1/.012 |
| 9 | 1.638 | 0.034 | 5.200 | 6.576 | 1/.05 |
| 10 | 1.463 | 0.076 | 4.656 | 5.879 | 1/.12 |
| 11 | 1.506 | 0.172 | 4.767 | 6.024 | 1/.25 |
| 12 | 1.642 | 0.368 | 5.202 | 6.547 | 1/.5 |
| 13 | 1.574 | 0.684 | 4.990 | 6.294 | 1/1 |

Solution viscosities were measured for the above solutions in Examples 7-13 after the solutions stood for one day at room temperature. These viscosities are shown in the following Table 4. Additionally, intrinsic viscosities were obtained for the solutions of Examples 7, 9 and 13 by extrapolation of reduced viscosities at concentrations of 0.33%, 0.5% and 1.0% for each solution by dilution with N-MP. These intrinsic viscosities are shown in Table 4. The concentration was calculated of BPDA and MDA, combined, in the total weight of the solution. A linear relationship is shown if $\log_{10}$ solution viscosity is plotted against $c^{1/2}$ where $c$ is moles of additives/grams of additive and solvent.

TABLE 4

| Example | Solution Viscosity at 25° C. (centistokes) | Intrinsic Viscosity at 25° C. (deciliter/gram) |
|---|---|---|
| 7 | 635 | 0.42 |
| 8 | 345 | |
| 9 | 169 | 0.27 |
| 10 | 125 | |
| 11 | 65 | |
| 12 | 39 | |
| 13 | 22 | 0.11 |

EXAMPLE 14

In this example, 1.2212 grams of reagent grade benzoic acid and approximately 15 grams of dry N-methyl-2-pyrrolidone were added to a 50 ml. flask. The contents of the flask was then sparged with anhydrous ammonia, resulting in an exothermic reaction forming ammonium benzoate. Sparging was continued until the flask began to cool. At this point the flask was found to have increased in weight by 0.2864 gram, or 0.1161 gram greater than the incremental weight change that would have resulted from the total conversion of benzoic acid to ammonium benzoate. This additional weight increase was caused by absorption of ammonia in the N-methyl-pyrrolidone, as indicated by the fact that the weight of the flask gradually decreased with time when the flask was vented to the atmosphere.

To the contents of the flask was then added 3.220 grams of BPDA, which went immediately into solution at room temperature. 2.0824 grams of ODA was placed in a separate container and dissolved at room temperature in approximately 6 grams of N-MP. The ODA solution was then added to the flask with mixing, resulting in a slightly exothermic reaction to form the polyamide acid. After this final addition, the weight of N-MP in the flask was 21.2 grams. The polymer solution, which had 20% solids without the additive, was quite fluid. The mole ratio of additive/BPDA/ODA was 1/1/1.04. A glass substrate was coated with the solution and heated for four minutes at 250° C. producing a clear, flexible polyimide film.

Although the utility of the polymer solutions of the present invention have been described in the above-mentioned patents principally in terms of applications as flexible films, it should be understood that these polymers may be used in other applications suitable for such compositions. Thus, these polyamide acid resins can be converted to polyimides and employed as insulation over a conducting core. Additionally, these polyimides can be employed over a conducting core previously coated with another polymer, or vice versa, to give laminated, insulated coatings on the wire to improve the properties of the insulation. They may also be used as dipping varnishes to impregnate coils of previously insulated wire, i.e., in the motor and generator rotors, field coils, etc. These resins may also be used in molding powder formulations by mixing with various fillers, for example, wood flour, diatomaceous earth, carbons, silica, abrasive grains, e.g., Carborundum, diamond grit, etc. These polymers are also useful in preparing fibers, as impregnants, and bonding materials for metallic and fibrous laminates, etc. The polymers in film form are suitable as a dielectric in making capacitors, as slot insulation in motors, etc.

It has been found that in accordance with the process herein described that it is possible to synthesize completely aromatic polyamide acids in organic-additive systems in which the viscosity can be adjusted readily. This simple direct process allows the preparation of coating solutions that are easily prepared and in which the viscosity of the solvent can be readily adjusted at will for control by variation in the amounts of the additive and thereby permit greater flexibility on application to glass and metal surfaces. Very simple mixing techniques are applied to produce a polymer solution useful for bonding glass fibers, for making laminations and for coating metal substrates for use as thermal and electrical insulating films.

It will of course be apparent to those skilled in the art that other benzophenone dianhydrides and other diamines may be employed in place of those recited in the foregoing examples, many illustrations of these reactants being given previously, without departing from the scope of the invention. The ratio of reactants as well as the proportions of the organic solvent and additive may also be varied within the ranges recited above. It is also to be understood that the conditions of reaction, formation of intermediate polyamide acid, and of the ultimate polyimide product can also be varied widely in accordance with the intended invention. The incorporation of other additives, such as light stabilizers, oxidation inhibitors, leveling additives, etc., is not precluded.

What we claim as new and desire to secure by Letters Patent of the United States is:

1. The process for making a polyamide acid solution which comprises (1) forming in a non-reactive, non-hydroxylic organic solvent selected from the class consisting of dialkylcarboxylamides, N-methyl-2-pyrrolidone, tetramethylene urea, dimethylsulfone, tetramethylenesulfone, and N-acetyl-2- pyrrolidone. a mixture of ingredients comprising (a) at least one benzophenone dianhydride, (b) at least one diamine selected from the group consisting of m-phenylenediamine and diamines having the formula,

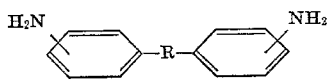

wherein R is a divalent radical selected from the group consisting of $C_{1-3}$ alkylene,

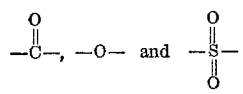

and for each mole of the dianhydride and (c) from 0.012 to 2 moles of an additive selected from the group consisting of (i) an ammonium salt of a saturated aliphatic monocarboxylic acid having from one to five carbon atoms, and (ii) an ammonium salt of an aromatic monocarboxylic acid, selected from the class consisting of benzoic and toluic acids, and (2) allowing the reactants to interact at a temperature below 40° C. to form the polyamide acid substantially free of any polyimide resin.

2. A process as in claim 1, wherein the diamine is m-phenylenediamine.
3. A process as in claim 1, wherein the diamine is 4,4′-methylenedianiline.
4. A process as in claim 1, wherein the diamine is 4,4′-oxydianiline.
5. A process as in claim 1, wherein the benzophenone dianhydride is 3,3′,4,4′,-benzophenonetetracarboxylic acid dianhydride.
6. A process as in claim 1, wherein the additive is ammonium acetate.
7. A process as in claim 1, wherein the additive is ammonium benzoate.
8. A process as in claim 1, wherein the solvent is N-methyl-2-pyrrolidone.
9. A process as in claim 1, wherein the solvent is N,N′,dimethylacetamide.
10. A polyamide acid solution comprising (1) the product of reaction of a mixture of ingredients comprising (a) at least one benzophenone dianhydride, and (b) at least one diamine selected from the group consisting of m-phenylenediamine, and diamines having the formula,

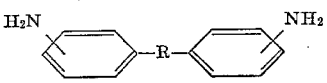

wherein R is a divalent radical selected from the group consisting of $C_{1-3}$ alkylene,

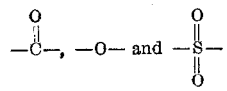

(2) an additive selected from the group consisting of (i) an ammonium salt of a saturated aliphatic monocarboxylic acid having one to five carbon atoms, and (ii) an ammonium salt of an aromatic monocarboxylic acid, selected from the class consisting of benzoic and toluic acids, and (3) a non-reactive, non-hydroxylic organic solvent, selected from the class consisting of dialkylcarboxylamides, N-methyl-2-pyrrolidone, tetramethylene urea, dimethylsulfone, tetramethylenesulfone and N-acetyl-2-pyrrolidone.

11. A composition as in claim 10, in which the benzophenone dianhydride is 3,3′,4,4′-benzophenonetetracarboxylic acid dianhydride.
12. A composition as in claim 10, in which the diamine is m-phenylenediamine.
13. A composition as in claim 10, in which the diamine is 4,4′-methylenedianiline.
14. A composition as in claim 10, in which the diamine is 4,4′-oxydianiline.
15. A composition as in claim 10, in which the additive is ammonium acetate.
16. A composition as in claim 10, in which the additive is ammonium benzoate.
17. A composition as in claim 10, in which the benzophenone dianhydride is 3,3′,4,4′-benzophenonetetracarboxylic acid dianhydride and the diamine is m-phenylenediamine.
18. A composition as in claim 10, in which the benzophenone dianhydride is 3,3′,4,4′-benzophenonetetracarboxylic acid dianhydride and the diamine is 4,4′-methylenedianiline.
19. A composition as in claim 10, in which the benzophenone dianhydride is 3,3′,4,4′ - benzophenonetetracarboxylic acid dianhydride and the diamine is 4,4′-oxydianiline.
20. The process for making a polyamide acid solution which comprises forming in a non-reactive, non-hydroxylic organic solvent selected from a class consisting of dialkylcarboxylamides, N - methyl - 2-pyrrolidone, tetramethylene urea, dimethylsulfone, tetramethylenesulfone, and N-acetyl-2-pyrrolidone, a mixture of ingredients comprising (a) at least one benzophenone dianhydride, (b) at least one diamine selected from the group consisting of m-phenylenediamine and diamines having the formula,

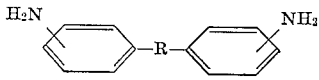

wherein R is a divalent radical selected from the group consisting of $C_{1-3}$ alkylene,

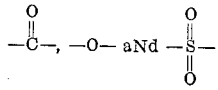

and for each mole of the dianhydride (c) from 0.012 to 2 moles of methanesulfonic acid.

21. A polyamide acid solution comprising (1) the product of reaction of a mixture of ingredients comprising (a) at least one benzophenone dianhydride, and (b) at least one diamine selected from the group consisting of m-phenylenediamine, and diamines having the formula,

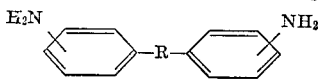

wherein R is a divalent radical selected from the group consisting of $C_{1-3}$ alkylene,

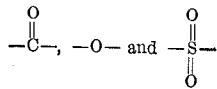

and (2) methanesulfonic acid.

References Cited

UNITED STATES PATENTS

| | | |
|---|---|---|
| 3,179,635 | 4/1965 | Frost. |
| 3,179,614 | 4/1965 | Edwards _____ 260—30.8 |
| 3,242,128 | 3/1966 | Chalmers. |
| 3,190,856 | 4/1965 | Lavin. |
| 2,244,192 | 6/1941 | Flory _____ 260—78 |

MORRIS LIEBMAN, Primary Examiner

P. R. MICHL, Assistant Examiner

U.S. Cl. X.R.

260—30.2, 30.8, 31.2, 32.4